(12) United States Patent
Yang et al.

(10) Patent No.: US 10,051,566 B2
(45) Date of Patent: Aug. 14, 2018

(54) SYSTEM AND METHOD FOR DATA COMMUNICATION IN A DECENTRALIZED AND POWER EFFICIENT MANNER

(71) Applicant: Futurewei Technologies, Inc., Plano, TX (US)

(72) Inventors: Yunsong Yang, San Diego, CA (US); Ji Chen, Shenzhen (CN); Xiaoxian Li, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 63 days.

(21) Appl. No.: 15/094,526

(22) Filed: Apr. 8, 2016

(65) Prior Publication Data

US 2016/0323819 A1   Nov. 3, 2016

Related U.S. Application Data

(60) Provisional application No. 62/155,316, filed on Apr. 30, 2015.

(51) Int. Cl.
   *H04W 52/02* (2009.01)
   *H04W 76/14* (2018.01)
   (Continued)

(52) U.S. Cl.
   CPC ....... *H04W 52/0209* (2013.01); *H04W 76/14* (2018.02); *H04W 8/005* (2013.01);
   (Continued)

(58) Field of Classification Search
   CPC ........... H04W 52/0209; H04W 76/023; H04W 8/005; H04W 84/12; Y02B 60/50
   See application file for complete search history.

(56) References Cited

U.S. PATENT DOCUMENTS

2004/0063442 A1*   4/2004   Goldberg .............. H04W 68/00
                                                              455/458
2010/0284387 A1    11/2010  Zhao et al.
(Continued)

FOREIGN PATENT DOCUMENTS

CN       101043753 A     9/2007
CN       102413549 A     4/2012
(Continued)

OTHER PUBLICATIONS

"Part 11: Wireless LAN Medium Access Control (MAC) and Physical Layer (PHY) Specifications," IEEE Standard for Information Technology—Telecommunications and Information Exchange Between Systems Local and Metropolitan Area Networks—Specific Requirements, IEEE Std 802.11, Mar. 29, 2012, pp. 1-2793.
(Continued)

*Primary Examiner* — Duc C Ho
(74) *Attorney, Agent, or Firm* — Slater Matsil, LLP

(57) ABSTRACT

A method for operating a first station configured for transmitting data includes generating a first frame including an identifier associated with a second station and a first timing information associated with a first time period for transmitting the data to the second station, the first time period occurring after a paging window. The method includes while within the paging window, attempting to obtain access to a channel, when the first station has not obtained access to the channel, modifying the first time period and the first timing information if the first station has received a second frame including a second timing information associated with a second time period, when the first station has obtained access to the channel, transmitting the first frame; and after the paging window, transmitting the data during the first time period if the first station was able to transmit the first frame.

20 Claims, 10 Drawing Sheets

(51) Int. Cl.
*H04W 8/00* (2009.01)
*H04W 84/12* (2009.01)

(52) U.S. Cl.
CPC ............. *H04W 84/12* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/21* (2018.01); *Y02D 70/22* (2018.01); *Y02D 70/26* (2018.01)

(56) References Cited

U.S. PATENT DOCUMENTS

| | | | |
|---|---|---|---|
| 2014/0126442 A1* | 5/2014 | Jafarian | H04W 52/0212 370/311 |
| 2014/0169290 A1 | 6/2014 | Seok | |
| 2015/0055546 A1 | 2/2015 | Jafarian et al. | |
| 2015/0071051 A1 | 3/2015 | Zhu et al. | |
| 2015/0117285 A1 | 4/2015 | Xie et al. | |
| 2016/0119894 A1 | 4/2016 | Patil et al. | |
| 2016/0165653 A1* | 6/2016 | Liu | H04W 76/023 370/329 |
| 2016/0174136 A1 | 6/2016 | Patil et al. | |
| 2016/0286574 A1* | 9/2016 | Abraham | H04L 63/065 |
| 2017/0164327 A1* | 6/2017 | Patil | H04W 68/02 |
| 2018/0049123 A1 | 2/2018 | Park et al. | |

FOREIGN PATENT DOCUMENTS

| | | |
|---|---|---|
| CN | 102740422 A | 10/2012 |
| CN | 102821466 A | 12/2012 |
| CN | 103379593 A | 10/2013 |
| EP | 1418686 A2 | 5/2004 |
| WO | 2010028605 A1 | 3/2010 |
| WO | 2014109874 A1 | 7/2014 |

OTHER PUBLICATIONS

IEEE Computer Society, IEEE Standard for Information technology—Telecommunications and informatoin exchange between systems Local and metropolitan area networks—Specific requirements, Part 11: Wireless LAN Medium Access Control (MAC) and Physical Layer (PHY) Specifications, IEEE Std 802.11-2012, Mar. 29, 2012, 2793 pages.

Liu, et al., "A Power-saving Scheduling for IEEE 802.11 Mobile Ad Hoc Network," Oct. 20, 2003, 8 pages.

Wu, et al., "An Energy Efficient MAC Protocol for IEEE 802.11 WLANs," May 19, 2004, 9 pages.

Zhang, et al., "TMMAC: An Energy Efficient Multi-Channel MAC Protocol for Ad Hoc Networks," Jun. 24-28, 2007 IEEE, 8 pages.

\* cited by examiner

SYSTEM AND METHOD FOR DATA COMMUNICATION IN A DECENTRALIZED AND POWER EFFICIENT MANNER

This application claims the benefit of U.S. Provisional Application No. 62/155,316, filed on Apr. 30, 2015, entitled "Method and System for Data Communication in a Decentralized and Power Efficient Manner," which application is hereby incorporated herein by reference.

TECHNICAL FIELD

The present invention relates to digital communications, and, in particular embodiments, to a system and method for data communication in a decentralized and power efficient manner.

BACKGROUND

The Institute of Electrical and Electronics Engineers (IEEE) Standard 802.11 is a set of media access control (MAC) and physical layer (PHY) specifications for implementing wireless local area network (LAN) or wireless fidelity (Wi-Fi) communication in the 2.4, 3.6, 5, and 60 GHz frequency bands. A basic service set (BSS) provides the basic building-block of an 802.11 wireless LAN. In an infrastructure mode of 802.11, a single access point (AP) together with all associated stations (STAs) is called a BSS. A station (STA) is also sometimes referred to as a device. Thus, these two terms are interchangeable. The AP acts as a master to control the STAs within that BSS. The simplest infrastructure BSS consists of one AP and one STA.

Currently, three important market trends drive the future evolution of Wi-Fi technology towards proximity-based device-to-device networking and data exchange. The first trend is the increasing geographic density of Wi-Fi-capable devices as the Wi-Fi technology continues to penetrate the mobile and consumer electronics markets. Metcalfe's law states that the value of a telecommunications network is proportional to the square of the number of compatible communicating devices participating in that network. Therefore, a high density of Wi-Fi devices increases the utility of Wi-Fi based device-to-device networking. The second trend is the growing popularity of social networking applications, many of which are proximity based, making smartphones, tablets, and other mobile devices the natural choices as the hardware platforms for these social networking applications. The third trend is the emerging mobile health, smart home, smart building, Internet of Things (IoT), etc., which will increase data traffic among devices in the proximity.

Although the IEEE 802.11 Standards define an independent BSS (IBSS) mode wherein two or more STAs can directly communicate with each other without direct intervention from a controlling AP, the IBSS mode doesn't scale well when the number of STAs becomes large and it also restricts to a single channel data operation. The IEEE 802.11s Amendment also defines an architecture and protocol that supports the mesh network. However, an IEEE 802.11s compliant mesh network requires high power consumption due to un-synchronized beacons and significant signaling overhead during topology change, making it unsuitable for devices running on battery power or in a high density or non-stationary environment.

A neighbor awareness networking (NAN) certification program has been initiated by the Wi-Fi Alliance to provide IEEE 802.11 technology a low-power mechanism that is executed in the background of compliant devices to make the compliant devices neighbor aware. NAN, which is based on proximity, does not require the real-time connection to a Wi-Fi infrastructure, servers, GPS or other geo-location, but instead uses direct device-to-device Wi-Fi to discover and exchange information. The NAN Release 1 (NAN1) specification has been published by the Wi-Fi Alliance and enables mobile devices to efficiently discover people and services in their proximity. The Wi-Fi Alliance is currently working on NAN Release 2 (NAN2) specification by introducing many-to-many data connectivity, along with other enhancement features such as accurate ranging and privacy protection. It is envisioned that the typical applications for NAN include Wi-Fi based mobile social networking, mobile commerce, mobile advertising, wireless multi-player gaming, group chatting, etc.

SUMMARY OF THE DISCLOSURE

Example embodiments provide a system and method for data communication in a decentralized and power efficient manner.

In accordance with an example embodiment, a method for operating a first station configured for transmitting data is provided. The method includes generating, by the first station, a first frame including an identifier associated with a second station and a first timing information associated with a first time period for transmitting the data to the second station, the first time period occurring after a paging window. The method includes, while within the paging window, attempting, by the first station, to obtain access to a channel, when the first station has not obtained access to the channel, modifying, by the first station, the first time period and the first timing information if the first station has received a second frame including a second timing information associated with a second time period, when the first station has obtained access to the channel, transmitting, by the first station, the first frame. The method includes, after the paging window, transmitting, by the first station, the data during the first time period if the first station was able to transmit the first frame.

In accordance with another example embodiment, a method for operating a station configured for receiving data is provided. The method includes receiving, by the station, a first frame during a paging window, the first frame including an identifier associated with the station and a first timing information associated with a time period for receiving the data, the time period occurring after the paging window, storing, by the station, the first timing information associated with the time period for receiving the data, and receiving, by the station, the data during the time period.

In accordance with another example embodiment, a first station adapted for transmitting data is provided. The first station includes a processor, and a computer readable storage medium storing programming for execution by the processor. The programming including instructions to configure the first station to generate a first frame including an identifier associated with a second station and a first timing information associated with a first time period for transmitting the data to the second station, the first time period occurring after a paging window, while within the paging window, attempt to obtain access to a channel, when the first station has not obtained access to the channel, modify the first time period and the first timing information if the first station has received a second frame including a second timing information associated with a second time period, when the first station has obtained access to the channel, transmit the first frame, and after the paging window, transmit the data during the first time period if the first station was able to transmit the first frame.

In accordance with another example embodiment, a station adapted for receiving data is provided. The station includes a processor, and a computer readable storage medium storing programming for execution by the processor. The programming including instructions to configure the station to receive a first frame during a paging window, the first frame including an identifier associated with the station and a first timing information associated with a time period for receiving the data, the time period occurring after the paging window, store the first timing information associated with the time period for receiving the data, and receive the data during the time period.

In accordance with another example embodiment, a method for operating a first station is provided. The method includes transmitting, by the first station, a first paging frame including a first duration set to a time difference between an end of a paging window and an end of the first paging frame, wherein a channel is preserved to allow a second station to contend for access to the channel for the first duration after the end of the first paging frame while disallowing a third station to access the channel for the first duration after the end of the first paging frame.

Practice of the foregoing embodiments enables a reduction in wake time of receiving stations waiting for transmissions thereby extending the battery life of such stations.

Furthermore, the practice of the foregoing embodiments reduce channel contention in transmitting stations, which results in less wake time for the transmitting stations, as well as reduction in network resource consumption.

BRIEF DESCRIPTION OF THE DRAWINGS

For a more complete understanding of the disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for data communications among peer stations. For example, a station generates a first frame including an identifier associated with a second station and a first timing information associated with a first time period for transmitting the data to the second station, the first time period occurring after a paging window. The station also, while within the paging window, attempts to obtain access to a channel, when the first station has not obtained access to the channel, modifies the first time period and the first timing information if the first station has received a second frame including a second timing information associated with a second time period, when the first station has obtained access to the channel, transmits the first frame; and after the paging window, transmits the data during the first time period if the first station was able to transmit the first frame.

The embodiments will be described with respect to example embodiments in a specific context, namely communications systems that support device to device communications. The embodiments may be applied to standards compliant communications systems, such as those that are compliant with Third Generation Partnership Project (3GPP), IEEE 802.11, and the like, technical standards, and non-standards compliant communications systems, that support device to device communications.

Figure 1:
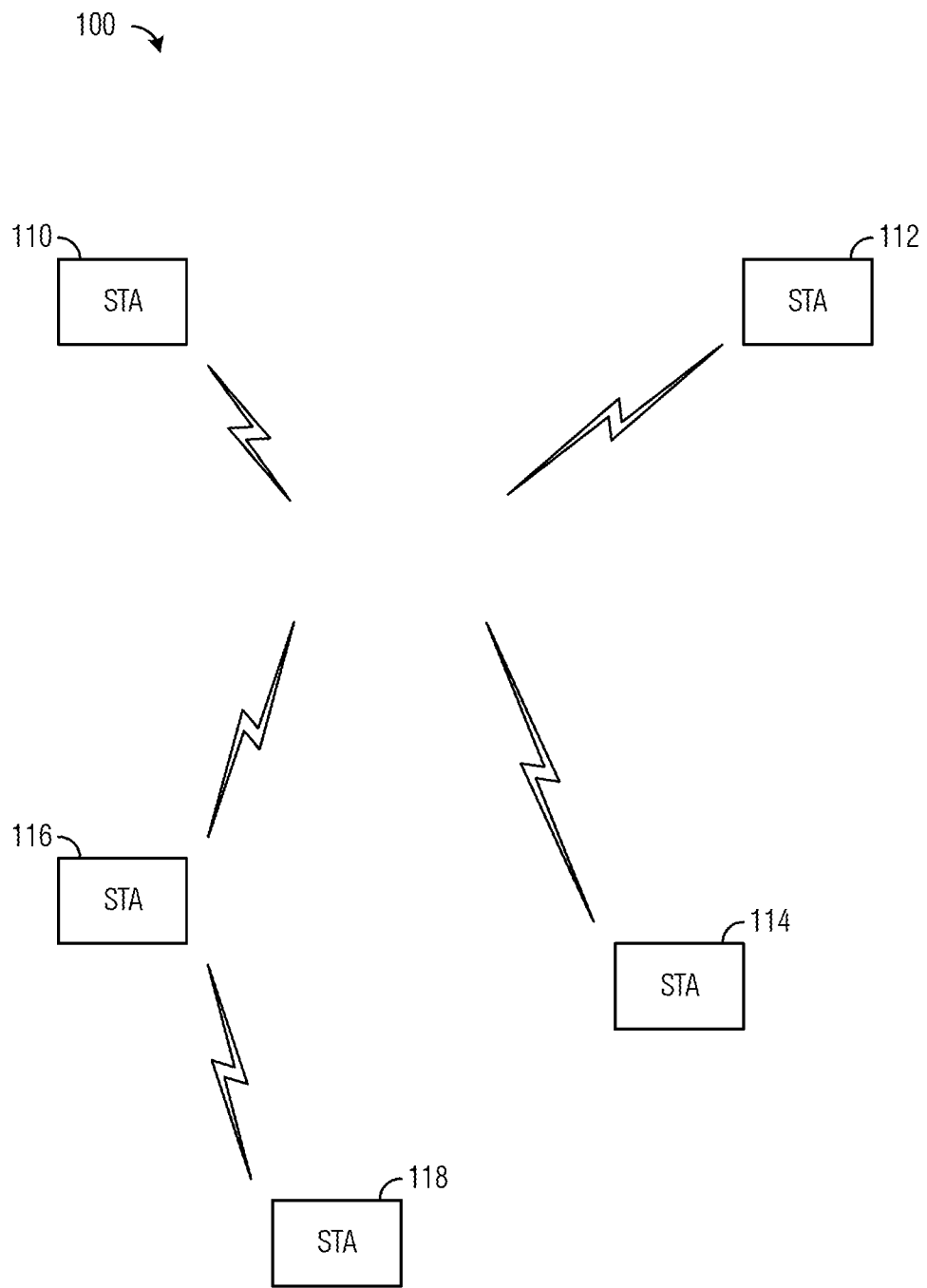
FIG. 1 illustrates a first example communications system.

FIG. 1 illustrates a first example communications system 100. Communications system 100 includes a plurality of stations (STAs), such as STA 110, STA 112, STA 114, STA 116, and STA 118. A STA may also be commonly referred to as a user equipment (UE), a mobile station, a mobile, a user, a subscriber, a terminal, a device, a communications device, and the like. In communications system 100, a first STA may transmit a frame directly to a second STA without going through a centralized entity such as an access point. While it is understood that communications systems may employ any number of STAs, only five STAs are illustrated for simplicity.

As stated before, one objective that the Wi-Fi Alliance is trying to achieve with the NAN Release 2 (NAN2) program is to provide proximity based device-to-device data connectivity with low power consumption. Therefore, a power saving mechanism for channel access during the NAN2 data operation is needed.

Figure 2:
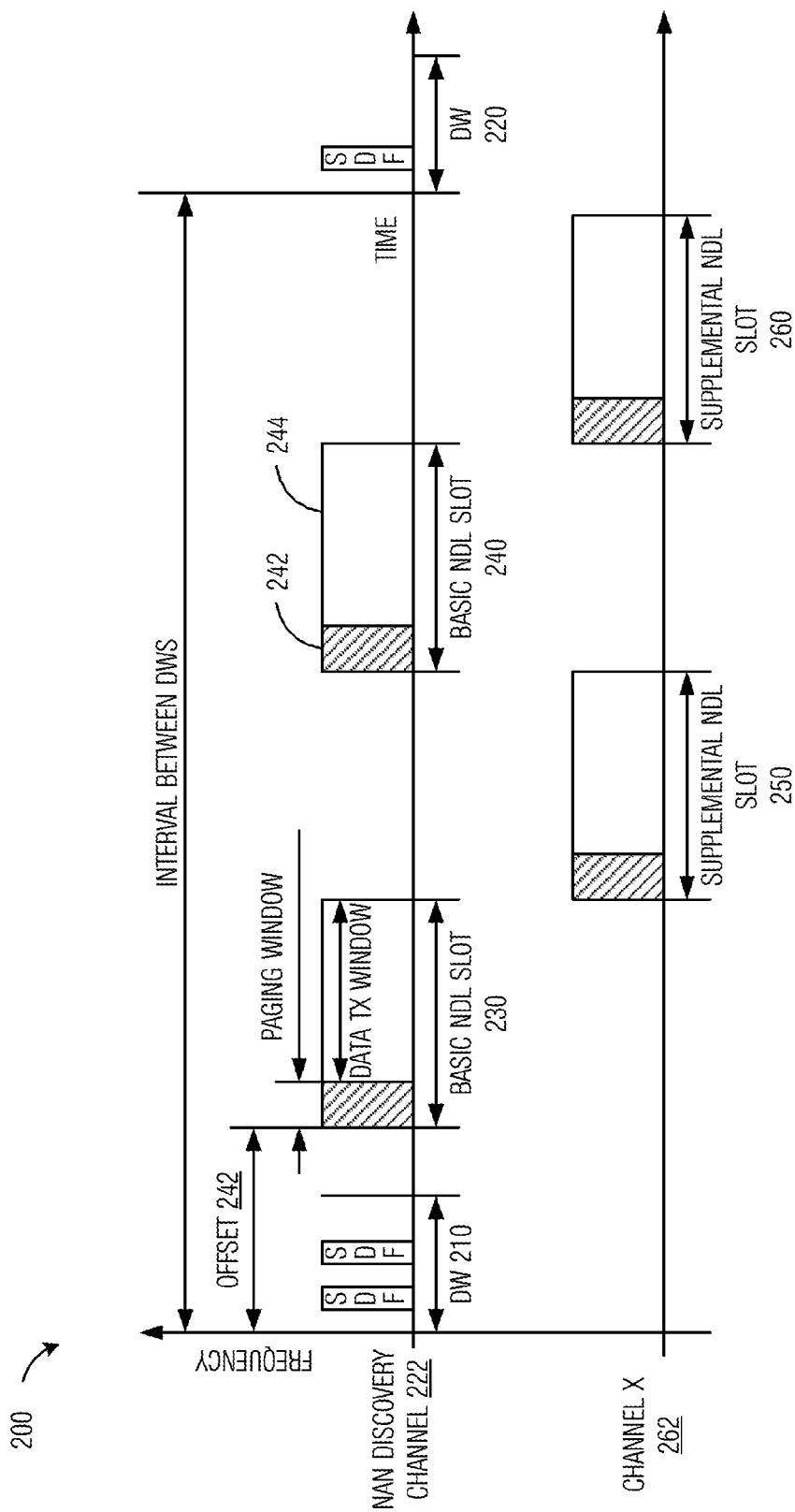
FIG. 2 illustrates an example operation of neighbor awareness networking (NAN) discovery and NAN data link (NDL), wherein a sequence of NAN Discovery Windows (DWs) are used for NAN discovery and a sequence of NDL Slots are used for NAN data link.

FIG. 2 illustrates an example operation 200 of neighbor awareness networking (NAN) discovery and NAN data link (NDL), wherein a sequence of NAN Discovery Windows (DWs) are used for NAN discovery and a sequence of NDL Slots are used for NAN data link. In order to enable NAN devices to discover a service or be discovered, a sequence of NAN Discovery Windows (DWs) with a fixed interval in between, such as DW 210 and DW 220 as shown in FIG. 2, are provisioned on a NAN Discovery Channel 222 using the synchronization mechanism specified in the Wi-Fi Alliance NAN Release 1 (NAN1) Technical Specification. As an example, the NAN Discovery channel on the 2.4 GHz band is the IEEE 802.11-defined Channel 6. A NAN device may contend for the NAN Discovery channel during a DW for sending a Service Discovery frame (SDF) in order to publish or subscribe a service.

In order to facilitate power efficient communication between devices, one or more Basic NDL Slots, such as Basic NDL Slot 230 and Basic NDL Slot 240 as shown in FIG. 2, are provisioned on NAN Discovery Channel 222 between two consecutive DWs, where two or more NAN devices may rendezvous. A Basic NDL Slot may be used for exchanging management messages, such as messages related to group formation, data link setup and parameters negotiation, allocation of Supplemental NDL Slot(s), channel switch announcement, authentication, security key distribution, association request, association response, de-authentication, de-association, and the like. A Basic NDL Slot may also be used for exchanging data. Different Basic NDL Slots may be used to serve different services or categories of services, respectively. Alternatively, one Basic NDL Slot may be used to serve different services or categories of services. One service may use multiple Basic NDL Slots.

The time offset from the beginning of the DW to the beginning of the first Basic NDL Slot within the same DW Interval, e.g., an offset 242, may be algorithmically derived from a parameter, such as a parameter of a NAN cluster, a NAN data group, a service or a category of services that the Basic DNL Slot supports, or a combination thereof. Therefore, the parameter may be a NAN cluster identifier (ID), a NAN data group ID, a service name, a hash of a service name, a service ID, a service category, or a combination thereof. A subsequent Basic NDL Slot serving the same service or category of services may be a fixed and pre-specified interval later. Alternatively, the time offset from the beginning of the DW to the beginning of the first Basic NDL Slot within the same DW Interval may be determined by the corresponding service publisher and announced during the DW when the service publisher is advertising the service. However, it may be desirable to avoid or to minimize the signaling overhead required to operate a Basic NDL Slot.

When the allocation of Basic NDL Slot(s) is not sufficient for the data traffic of a particular service or a particular NAN device participating in the data group, additional Supplemental NDL Slot(s), such as Supplemental NDL Slot 250 and Supplemental NDL Slot 260 in FIG. 2, may be provisioned. The Supplemental NDL Slots may be allocated on the NAN Discovery channel or other Wi-Fi frequency channels (such as Channel X 262 in FIG. 2). The messages for allocating Supplemental NDL Slot(s) may be conveyed using the Basic NDL Slots. This will allow much greater flexibility for allocating the time and frequency resources for the Supplemental NDL Slots and for negotiating other parameters, such as access related parameters, security related parameters, and the like, for operating the Supplement NDL Slots. It may be undesirable to convey the messages for allocating the Supplemental NDL Slot(s) during the DWs, as they may jam the channel during the DWs and compromise the performance for system synchronization and for service discovery, which are the two primary purposes of the DWs.

The design of a combination of Basic NDL Slots, which use a simple allocation scheme with low or no signaling overhead, and the optional Supplemental NDL Slots, which offer much greater flexibility and are allocated only when needed, helps to meet the needs of a wide variety of real-world usage scenarios for NAN2 data communications.

As shown in FIG. 2, each Basic NDL Slot (such as Basic NDL Slot 240) and Supplemental NDL Slot (such as Supplemental NDL Slot 250) has the same structure, which consists of a Paging Window (such as Paging Window 242) and a Data Transmission (Tx) Window (such as Data Transmission Window 244) in that order. In order to save power, a STA may enter a power saving mode after the DW. However, all STAs wake up during the Paging Windows of their associated Basic NDL Slot(s), and of their associated Supplemental NDL Slot(s) (if there are any), in order to transmit or receive a paging message.

A paging message in a Paging Window is used by a data source STA (i.e., a STA transmitting data) to inform one or more target data sink STAs (i.e., STAs targeted for receiving the data) of a pending data transmission during a Data Transmission Window (such as Data Transmission Window 244) immediately following the Paging Window (such as Paging Window 242). A paging message includes an identifier of each target data sink STA or a group identifier that identifies a group of target data sink STAs. If a STA doesn't receive any paging message targeted for it (or for its group) during a Paging Window, it may enter a power saving mode at the end of the Paging Window until the next associated Paging Window (of an associated Basic NDL Slot and/or an associated Supplemental NDL Slot) or the next DW, whichever comes first, as the STA is not expecting to receive any data during the Data Transmission Window immediately following the Paging Window (in which it did not receive a paging message targeted for it).

A STA successfully receiving a paging message targeted for it or for its group during a Paging Window may transmit a paging acknowledgement message back to the corresponding data source STA within a pre-specified short interval (such as a short inter-frame space (SIFS) defined in the IEEE 802.11 Standards, which is hereby incorporated herein by reference) in the same Paging Window. A data source STA that has sent a paging message during a Paging Window but has not received a corresponding paging acknowledgement message within the pre-specified short interval may enter a power saving mode at the end of the Paging Window until the next associated Paging Window (of an associated Basic NDL Slot and/or an associated Supplemental NDL Slot) or the next DW, whichever comes first, as the data source STA may determine that there is no target data sink STA in the proximity to receive the data, therefore, that there is no need to transmit the data.

Figure 3:
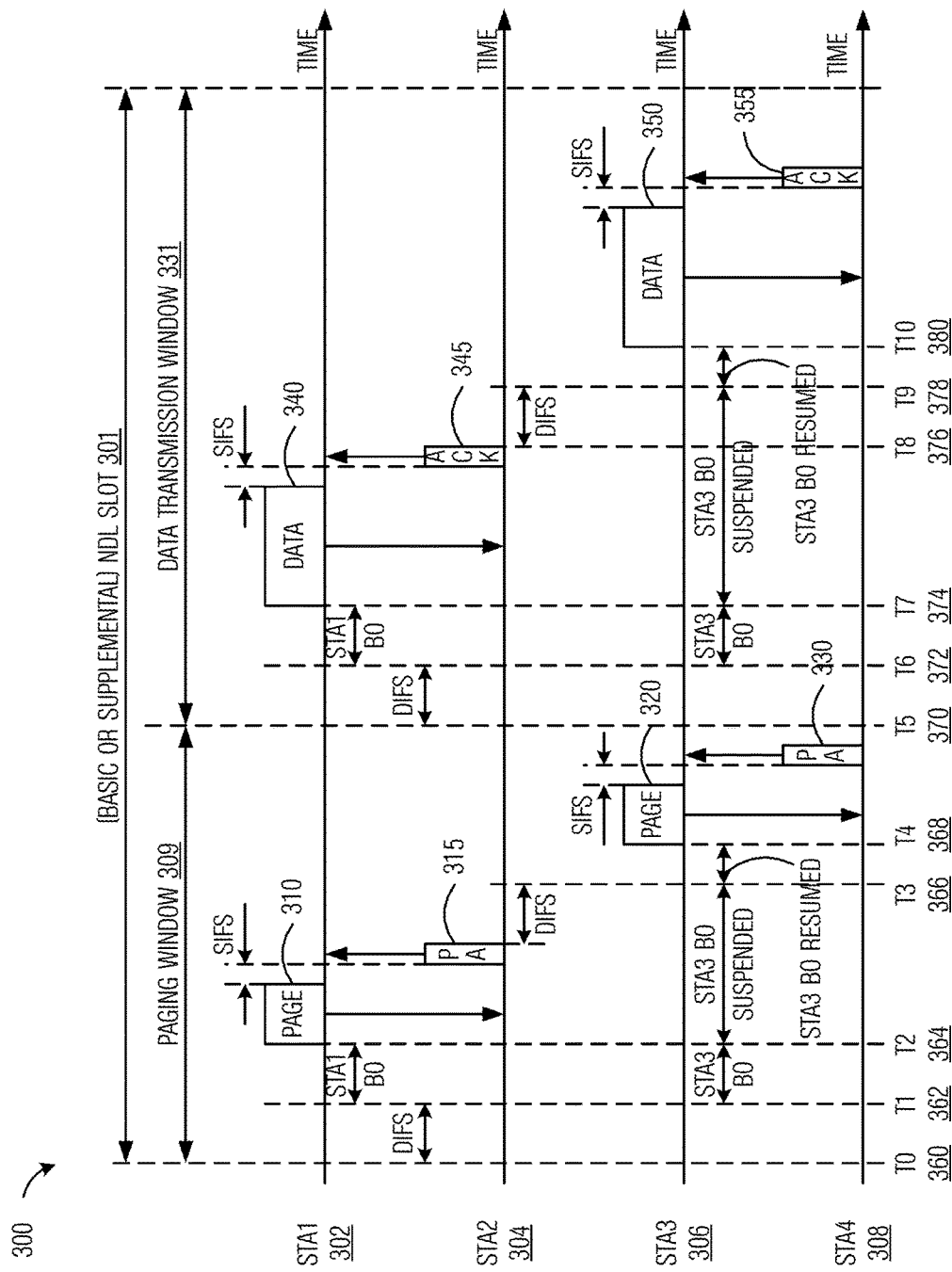
FIG. 3 illustrates a first example embodiment of operations occurring during an NDL Slot.

FIG. 3 illustrates an example embodiment of operations 300 occurring during an NDL Slot, such as Basic NDL Slot 230 and Supplemental NDL Slot 250 in FIG. 2. Operations 300 may be indicative of operations occurring in one or more STAs as the STAs participate in direct STA-to-STA communications. As shown in FIG. 3, at time T0 360, which marks the beginning of the Paging Window 309 of the NDL Slot 301, a plurality of STAs, such as STA1 302, STA2 304, STA3 306, and STA4 308, wake up. STA1 302 has a data (such as Data 340) to be sent to STA2 304 and STA3 306 has a data (such as Data 350) to be sent to STA4 308. Thus, STA1 302 generates a paging message (such as Page 310) including an identifier of STA2 304. Similarly, STA3 306 generates a paging message (such as Page 320) including an identifier of STA4 308.

The generation of paging messages Page 310 and Page 320 trigger STA1 302 and STA3 306, respectively, to start a channel contention procedure by initiating a random value on a backoff (BO) timer and detecting if the channel has been idle for a time period that equals to a distributed inter-frame space (DIFS) as defined in the IEEE 802.11 Standards. At time T1 362, each one of STA1 302 and STA3 306 detects that the channel has been idle for a DIFS period and starts to count down its backoff timer at a constant and pre-specified rate until it detects that the channel becomes busy or its backoff timer reaches zero, whichever comes first. At time T2 364 in the particular example illustrated in FIG. 3, STA1 302 wins the channel contention by counting its backoff timer down to zero first and transmits Page 310. STA3 306 detects that the channel becomes busy and suspends counting down of its backoff timer.

STA2 304 receives Page 310 successfully, and then STA2 304 may transmit a paging acknowledgement message (such as PA 315) to STA1 302 after waiting for a short inter-frame interval (SIFS) as defined in the IEEE 802.11 Standards. In order for STA3 306 to resume counting down its backoff time, STA3 306 needs to detect that the channel has been idle for a DIFS period again. STA3 306 can't resume counting down its backoff timer during the idle period that is between Page 310 and PA 315 because a SIFS is shorter than a DIFS. The transmission of PA 315 by STA2 304 resets the attempt of detecting that the channel has been idle for a DIFS period by STA3 306. STA3 306 has to wait until time T3 366, which is one DIFS period after the end of PA 315, before it can resume counting down its backoff time. Eventually, at time T4 368, STA3 306 counts down its backoff timer to zero and transmits Page 320. STA4 308 receives Page 320 successfully, and then waits for a SIFS period before transmitting a paging acknowledgement message (i.e., PA 330) to STA3 306.

At time T5 370, which marks the beginning of the Data Transmission Window 331 of the NDL Slot 301, in order to transmit its data, each one of STA1 302 and STA3 306 starts a second channel contention procedure by initiating a second random value on its backoff timer and detecting if the channel has been idle for a DIFS period. Meanwhile, STA2 304 and STA4 308 stay awake in order to receive their respective data. At time T6 372, each one of STA1 302 and STA3 306 detects that the channel has been idle for a DIFS period and starts to counting down its own respective backoff timer. At time T7 374 in the particular example illustrated in FIG. 3, STA1 302 wins the channel contention again and transmits Data 340. STA3 306 detects that the channel becomes busy and suspends counting down of its backoff timer. STA2 304 receives Data 340 successfully, and then waits for a SIFS period before transmitting an acknowledgement (ACK) frame (i.e., ACK 345) to STA1 302. STA3 306 waits until time T9 378, which is one DIFS period after the end of ACK 345, before it can resume counting down its backoff time. Eventually, at time T10 380, STA3 306 counts down its backoff timer to zero and transmits Data 350. STA4 308 receives Data 350 successfully, and then STA4 308 may transmit an acknowledgement frame (i.e., ACK 355) to STA3 306 after waiting for a SIFS period.

From the viewpoints of power consumption and channel efficiency, there are several drawbacks present in operations 300. First, the data source STAs (such as STA1 302 and STA3 306) need to contend for the channel not only when transmitting the paging message, but also when transmitting the data. Contending for the channel is power consuming for a STA, as the STA is usually not in a power saving mode when contending for the channel for a transmission. Therefore, contending for the channel twice causes more power consumption for the data source STAs. Furthermore, as for a data sink STA (such as STA2 304 and STA4 308), which has received a valid paging message during the Paging Window, it has to keep awake after the Paging Window until it receives its data, because it doesn't know when its corresponding data source STA will gain the channel access through wining the channel contention and start to transmit data. In the example illustrated in FIG. 3, STA2 304 has to stay awake between T5 370 and T7 374 and STA4 308 has to stay awake between T5 370 and T10 380, even though there is no data transmission to them during those time intervals. An excessive waiting period after the Paging Window may waste the battery power for the data sink STAs. Secondly, the channel utilization efficiency (or channel efficiency) during the channel contention is also low due to the random backoff periods used for avoiding collisions and the DIFS waiting periods before a STA can start or resume its random backoff. In the example illustrated in FIG. 3, the channel is not utilized for transmissions between T5 370 and T7 374 and between T8 376 and T10 380 for these reasons.

In a high density environment, which is required for NAN2 to be able to scale well, all these matters of low power efficiency on a data source STA and on a data sink STA, and low channel utilization efficiency will become worse due to the elevated probability of collisions and the prolonged maximum window size for the random backoff in response to the elevated collision probability. Under this circumstance, doubling the number of channel contentions by requiring a data source STA to contend for the channel twice (i.e., when transmitting the paging message and when transmitting the data) will only make all matters even worse. So, it is desirable for the same data source STA to avoid contending for the channel for the second time when transmitting the data during the Data Transmission Window.

According to an example embodiment, a method for avoiding contending for the channel twice is disclosed herein. According to an aspect of the example embodiments, a data source STA may contend for the channel for transmitting a paging message to one or more data sink STAs during a Paging Window. The paging message may include one or more identifiers of the data sink STA(s), wherein each identifier may be an individual identifier or a group identifier. The paging message may further include timing information specifying a time period occurring during a Data Transmission Window immediately following the Paging Window for transmitting a data to the data sink STA(s). After successfully transmitting the paging message, which may include receiving a positive acknowledgement for the paging message from a data sink STA, the data source STA may transmit the data to the data sink STA(s) during the specified time period without the need of contending for the channel for a second time. And during the Data Transmission Window, the data sink STA, having received the paging message, is required to be awake only during the specified time period to receive the data.

Figure 4:
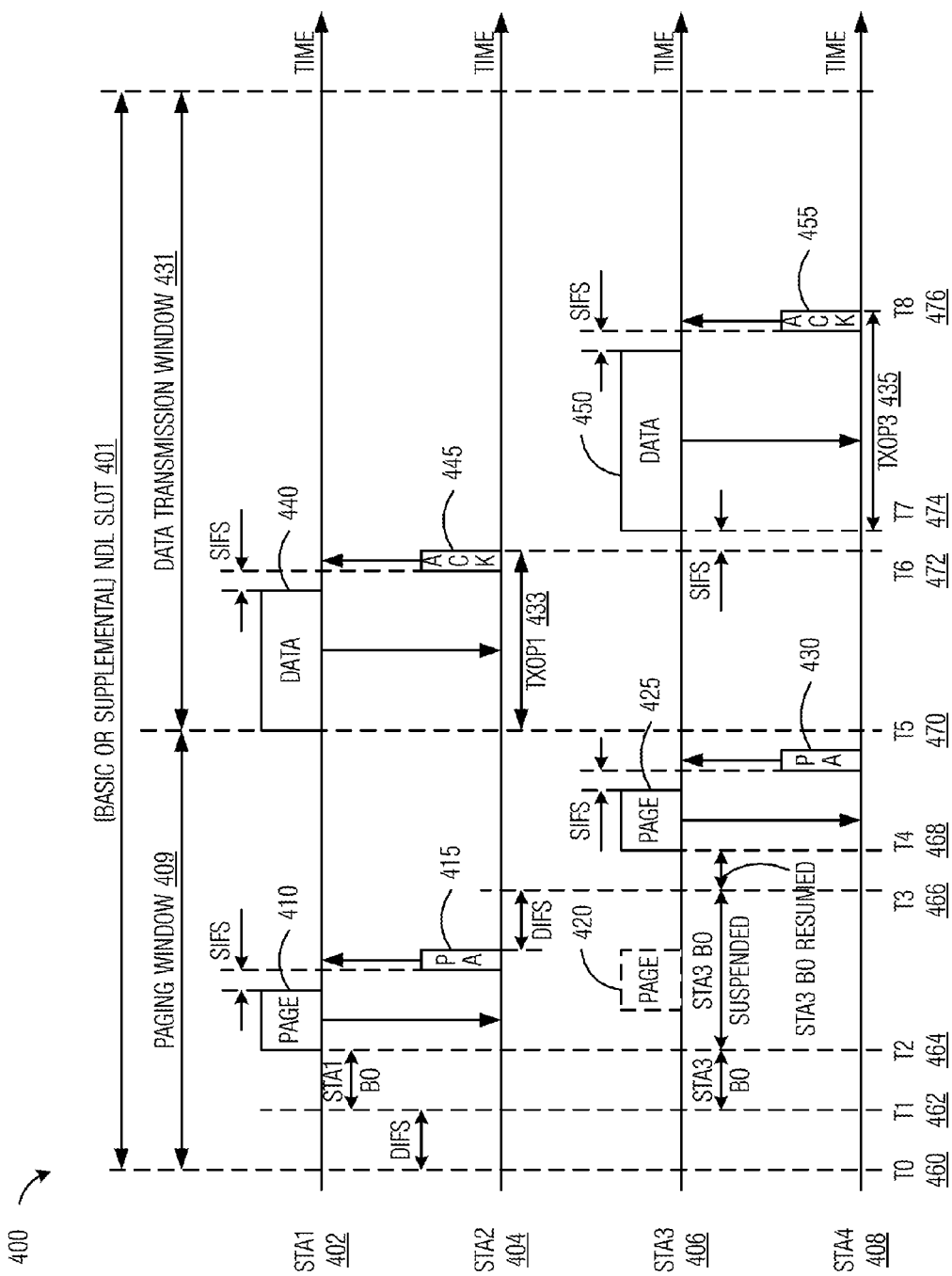
FIG. 4 illustrates a second example embodiment of enhanced operations occurred during an NDL slot in accordance with an embodiment presented herein.

FIG. 4 illustrates an example embodiment of enhanced operations 400 occurred during an NDL slot, such as Basic NDL Slot 230 or Supplemental NDL Slot 250 in FIG. 2. Operations 400 may be indicative of operations occurring in one or more STAs as the STAs participate in direct STA-to-STA communications. As shown in FIG. 4, at time T0 460, which marks the beginning of the Paging Window 409 of the NDL Slot 401, a plurality of STAs, such as STA1 402, STA2 404, STA3 406, and STA4 408, wake up. STA1 402 has a data (such as Data 440) to be sent to STA2 404 and STA3 406 has a data (such as Data 450) to be sent to STA4 408. STA1 402 generates a paging message (such as Page 410) including an identifier of STA2 404 and the timing information specifying a time period, referred to as a transmission opportunity (TXOP) (such as TXOP1 433 occurred between time points T5 470 and T6 472 in FIG. 4), occurring during the Data Transmission (Tx) Window 431 immediately following the Paging Window 409. The identifier is used to identify the STA(s) (such as STA2 404) that needs to be awake during the specified time period to receive the data (such as Data 440) and to transmit an ACK frame (such as ACK 445).

Figure 5:
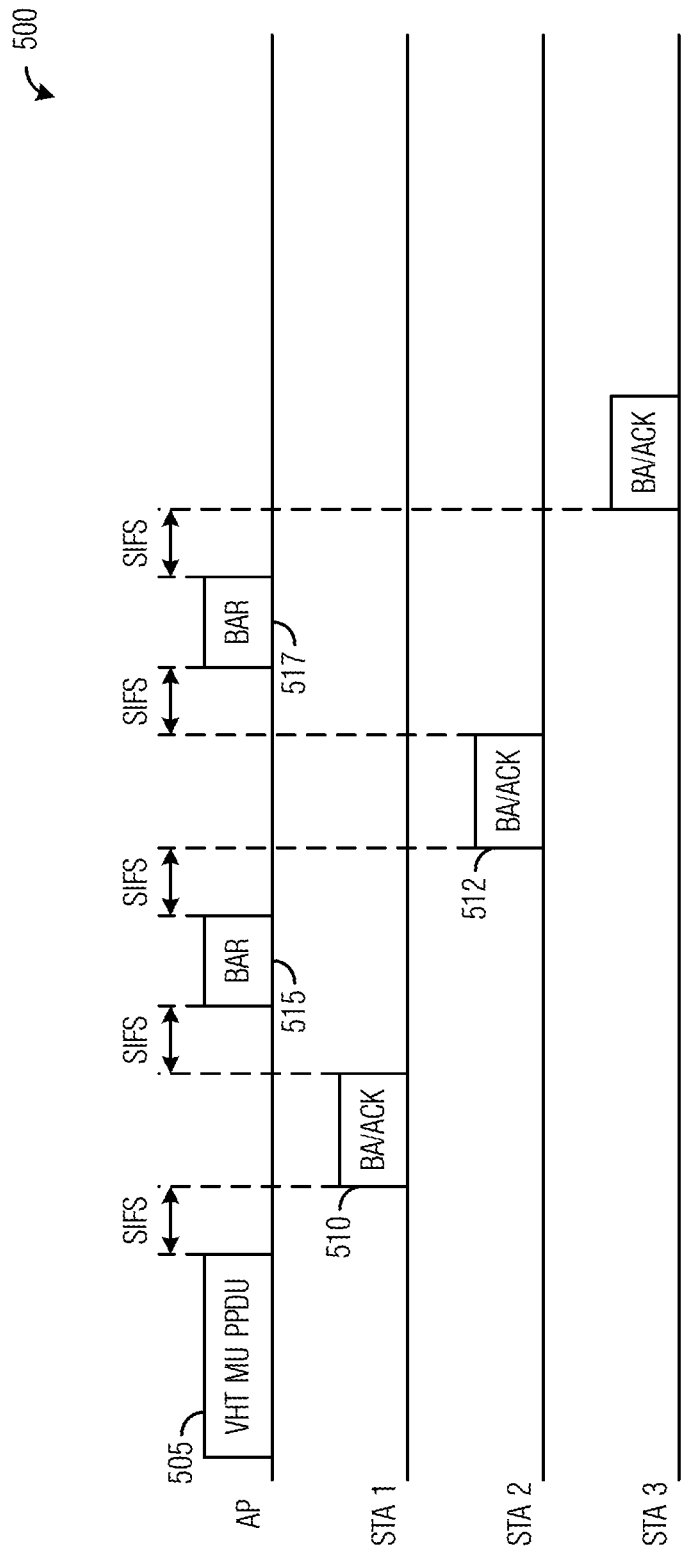
FIG. 5 illustrates an example embodiment of operations within a transmission opportunity (TXOP) for multicast data transmission in accordance with an embodiment presented herein.

A TXOP (such as TXOP1 433 in FIG. 4) is the time interval during which a STA (such as STA1 402) has the right to initiate frame exchanges onto the channel. FIG. 5 illustrates an example embodiment of operations within a TXOP 500 for multicast data transmission, using very high throughput (VHT) multi-user (MU) PHY protocol data unit (PPDU). As shown in FIG. 5, TXOP 500 includes not only the time required to transmit the data 505 by the data source STA or AP, but also the time required by one or more data sink STAs to each transmit an acknowledgement (ACK) or a block ACK (BA) frame such as BA/ACK 510 and BA/ACK 512, plus the time required by the data source STA or AP to transmit one or more block ACK request (BAR) frames, such as BAR 515 and BAR 517, to one or more data sink STAs, and plus all the short inter-frame spaces (SIFSs) in between.

Referring back to FIG. 4, in the paging message (such as Page 410), according to a first example embodiment, the information specifying the TXOP (such as TXOP1 433) may include the starting time of the TXOP (such as T5 470) and the duration of the TXOP. A data source STA (such as STA1 402) may estimate the duration of the TXOP based on the amount of data to be transmitted, a modulation and coding scheme (MCS) to be used for transmitting the data, the time required for transmitting any ACK, BA, or BAR frame, and any SIFS required in between. Alternatively, according to a second example embodiment, the information specifying the TXOP (such as TXOP1 433) may include the starting time of the TXOP (such as T5 470) and the ending time of the TXOP (such as T6 472), wherein the ending time of the TXOP is equal to the sum of the starting time and the duration of the TXOP. Thus, as an illustrative example, Page 410 may include the identifier of STA2 (e.g., in an identifier field), the value of T5 470 (e.g. in a TXOP starting time field), and the duration of TXOP1 433 (e.g., in a TXOP duration field), according to the first example embodiment. Alternatively, as another illustrative example, Page 410 may include the identifier of STA2 (e.g., in an identifier field) and the values of T5 470 and T6 472 (e.g., in a TXOP starting time field and a TXOP ending time field, respectively), according to the second example embodiment.

Similarly, STA3 406 generates a paging message (such as Page 420) to be sent to STA4 408. Page 420 may include an identifier of STA4 408, the starting time of a TXOP2 that STA3 406 initially wishes to subscribe in order to transmit the data to STA4 408, and the duration of TXOP2 (according to the first example embodiment as described before). Alternatively, Page 420 may include the identifier of STA4, the starting of TXOP2, and the ending time of TXOP2 (according to the second example embodiment as described before), wherein the ending time of TXOP2 is equal to the sum the starting time and duration of TXOP2. It is noted that TXOP2 is not shown in FIG. 4 because it is not eventually materialized in the example illustrated in FIG. 4. Page 420 is shown in dashed lines since it is not actually transmitted due to STA1 402 contending and acquiring the channel.

Before a data source STA (such as STA1 402 and STA3 406) can detect any other STA's paging message or paging acknowledgement (PA) message, the STA wishes to subscribe the channel from the beginning of a Data Transmission Window (such as T5 470 in FIG. 4 for Data Transmission Window 431). Therefore, the starting time of the TXOP1 433 that STA1 402 wishes to subscribe in Page 410 is T5 470 and the starting time of the TXOP2 that STA3 initially wishes to subscribe in Page 420 is also T5 470.

The generation of paging messages Page 410 and Page 420 trigger STA1 402 and STA3 406, respectively, to start a channel contention procedure by each initiating a random value on its backoff timer and detecting if the channel has been idle for a DIFS period. At time T1 462, each one of STA1 402 and STA3 406 detects that the channel has been idle for a DIFS period and starts to count down its respective backoff timer at a constant and pre-specified rate until it detects that the channel becomes busy or its backoff timer reaches zero, whichever comes first. At time T2 464 in the particular example illustrated in FIG. 4, STA1 402 wins the channel contention by counting its backoff timer down to zero first and transmits Page 410 (which is acknowledged by PA 415). STA3 406 detects that the channel becomes busy, thus suspends the counting down of its backoff timer. STA3 406 decodes Page 410 and realizes that STA1 402 has subscribed the time period between T5 470 and T6 472, which overlaps with the time period that STA3 406 initially wishes to subscribe (per Page 420).

As a result, STA3 406 abandons the pending transmission of Page 420 and replaces it with a new paging message Page 425 in order to subscribe a new TXOP (such as TXOP3 435 occurring between T7 474 and T8 476 in FIG. 4), which occurs after TXOP1 433 with a pre-specified short interval, such as a short inter-frame space (SIFS), in between. STA3 406 computes the starting time of TXOP3 435 (such as T7 474) as equal to the sum of a pre-specified short interval (such as a SIFS) and the ending time of TXOP1 433 (such as T6 472), the latter of which is obtained directly from Page 410 (according to the second example embodiment) or is computed as equal to the sum of the starting time and duration of TXOP1 433 (both of which are obtained from Page 410 according to the first example embodiment). Thus, T7 474 is always greater than T6 472 to ensure there is no overlapping between TXOP1 433 and TXOP3 435. STA3 406 may estimate the duration of its own TXOP (such as TXOP3 435) according to the same method used by STA1 402 as described before. According to the first example embodiment of information specifying a subscribed TXOP, as described before, Page 425 may include the identifier of STA4 408 (e.g., in an identifier field), the value of T7 474 (e.g., in a TXOP starting time field), and the duration of TXOP3 435 (e.g., in a TXOP duration field). Alternatively, according to the second example embodiment of information specifying a subscribed TXOP, as described before, Page 425 may include the identifier of STA4 408 (e.g., in an identifier field) and the values of T7 474 and T8 476 (e.g., in a TXOP starting time field and a TXOP ending time field, respectively), wherein T8 476 is equal to the sum of T7 474 and the duration of TXOP3 435.

It should be obvious that the steps of abandoning the pending transmission of Page 420 and replacing it with a new paging message Page 425 in order to subscribe a new TXOP may be implemented simply as modifying the corresponding values in Page 420, thus is within the spirit of the present example embodiments. It should be noted that a data source STA may modify the timing information of its planned TXOP more than once if there are more than one other STAs that are able to transmit their respective paging message ahead of the data source STA. At time T3 466, STA3 406 resumes counting down its backoff timer as the channel has been idle for a DIFS period. At time T4 368, STA3 306 counts down its backoff timer to zero and transmits Page 425 (which is acknowledged by PA 430).

The starting time, the ending time, and the duration of a subscribed TXOP may be expressed in the unit of microsecond, millisecond, or any pre-specified time unit such as a time block. The starting time and the ending time of all subscribed TXOPs within the same NDL slot may be expressed as time offsets from a common timing reference, such as the beginning of the Paging Window of that NDL slot (such as T0 460 in FIG. 4, for example) or the beginning of the Data Transmission Window of that NDL slot (such as T5 470 in FIG. 4, for example). Alternatively, the starting time and the ending time of each individually subscribed TXOP may be expressed as time offsets from the end of the frame that carries the starting time and the ending time.

After receiving Page 410, STA2 404 may send a paging acknowledgement (PA) message (such as PA 415) back to STA1 402. PA 415 serves as an indication that STA2 404 will be awake and ready to receive data during the specified time period (such as TXOP1 433). According to an example embodiment of the PA message, a PA message (such as PA 415) may also include the timing information of the specified TXOP (such as TXOP1 433), which is obtained from the corresponding paging message (such as Page 410). If the timing information of all subscribed TXOPs within the same NDL slot are expressed as time offsets from a common timing reference, as described previously, STA2 404 can directly copy the timing information in the paging message (such as Page 410) into its PA message (such as PA 415). For example, if Page 410 includes the values of T5 470 and T6 472 (e.g., in a TXOP starting time field and a TXOP ending time field, respectively), PA 415 also includes the values of T5 470 and T6 472 (e.g., in a TXOP starting time field and a TXOP ending time field, respectively). For another example, if Page 410 includes the values of T5 470 and the duration of TXOP1 (e.g., in a TXOP starting time field and a TXOP duration field, respectively), PA 415 also includes the values of T5 470 and the duration of TXOP1 (e.g., in a TXOP starting time field and a TXOP duration field, respectively). If the starting time and the ending time of each individually subscribed TXOP is expressed as time offsets from the end of the frame that carries the starting time and the ending time, as described previously, STA2 404 may adjust the timing information in its PA message (such as PA 415) by copying the starting time and the ending time in the received paging message (such as Page 410), then subtracting them by a time duration spanning from the end of the frame carrying the paging message (such as Page 410) to the end of the frame carrying the PA message (such as PA 415). STA2 404 should maintain the value of the TXOP duration, if it is included in the PA message. Repeating the timing information of the subscribed TXOP, including making necessary adjustments, in an acknowledgement message sent by a data sink STA helps to ensure that more STAs operating in the proximity can decode the timing information of the subscribed TXOP, thus reducing the chance that overlapping subscriptions of the channel are made by STAs that are hidden nodes to each other. Similarly, after receiving Page 425, STA4 408 may send a paging message (such as PA 430) to STA3 406 that includes the timing information of the specified TXOP (such as TXOP3 435).

There may be other IEEE 802.11-compliant Wi-Fi STAs or APs in the proximity that may not be complaint with the Wi-Fi Alliance defined NAN2 specification. These Wi-Fi STAs or APs may also contend for the same channel during the Paging Window in order to transmit their data. Even though they may initially lose the channel contention to STA1 402 during the Paging Window, as soon as the channel becomes idle for more than a DIFS period, one of these non-NAN2-compliant Wi-Fi STAs may eventually win the channel contention and starts to transmit data, and its data transmission may be so extensive that it may eventually overlaps with the TXOP1 433 that STA1 402 has already subscribed. The data transmission may take place because the non-NAN2-compliant Wi-Fi STAs have no knowledge of the subscribed TXOP1 433 and assume that the channel is clear and is theirs to use. Therefore, in order to ensure that the TXOP it is subscribing will not be violated by other devices that are IEEE 802.11-compliant but not NAN2-compliant, STA1 402 also includes a Duration field in a frame carrying Page 410.

According to the IEEE 802.11 Standards, a virtual channel sensing (CS) function is provided by the media access control (MAC) layer of IEEE 802.11 using a network allocation vector (NAV). NAV is an indicator, maintained by each Wi-Fi STA and AP, of time periods when transmission onto the channel is not initiated by the STA or AP. Any Wi-Fi STA or AP receiving a valid frame where the value in the Address 1 field, which is also known as the Receiver Address (RA) field, in the MAC header of the frame is not the MAC address of the STA or AP should update its NAV with the value received in the Duration field in the MAC header of the frame. The NAV may be thought of as a counter, which counts down to 0 at a uniform rate. When the counter is 0, the virtual CS function indicates that the channel is idle; when nonzero, the channel is busy, thus can't (or shouldn't) be accessed.

Therefore, STA1 402 may set the value of the Duration field in the frame carrying Page 410 so that it prevents any non-NAN2-compliant Wi-Fi STAs from acquiring channel access during the Paging Window as soon as STA 402 wins the channel contention at time T2 464. For example, the STA1 402 may set the value of the Duration field in the frame carrying Page 410 to be equal to the time T5 470 minus the time when STA1 402 generates Page 410 minus the duration of the frame carrying Page 410. In this way, STA1 402 has protected the channel from being accessed by a non-NAN2-compliant STA for the remainder of the Paging Window. Then by successfully transmitting the frame carrying Page 410 at time T2 464, STA1 402 not only secures the TXOP1 433 that it is trying to subscribe, but also secures the rest of the Paging Window (such as Page Window 409) for the other NAN2 data source STAs (such as STA3 406) to transmit their respective paging message.

It is noted that NAN2-compliant STAs (such as STA2 404, STA3 406, and STA4 408) will not update their NAV with the value found in the Duration field of the frame carrying Page 410. So, NAN2-compliant STAs (such as STA2 404, STA3 406, and STA4 408) may continue their attempts to access the channel during the rest of the Paging Window based on the operations described previously. When responding to Page 410, STA2 404 may include a Duration field in a frame carrying PA 415 and set the value of the Duration field in the frame carrying PA 415 to be equal to the value of Duration field in the frame carrying Page 410 minus the duration of the frame carrying PA 415 minus the duration of a SIFS. Similarly, STA3 406 may initially include a Duration field in a frame carrying Page 420 and set the value of the Duration field in the frame carrying Page 420 to be equal to time T5 470 minus the time when STA3 406 generates Page 420 minus the duration of the frame carrying Page 420. Later on, STA3 406 may include a Duration field in a frame carrying Page 425 and set the value of the Duration field in the frame carrying Page 425 to be equal to time T5 470 minus the time when STA3 406 generates Page 425 minus the duration of the frame carrying Page 425. When responding to Page 425, STA4 408 may include a Duration field in a frame carrying PA 430 and set the value of the Duration field in the frame carrying PA 430 to be equal to the value of Duration field in the frame carrying Page 425 minus the duration of the frame carrying PA 430 minus the duration of a SIFS. Alternatively, all NAN2-compliant STAs (such as STA1 402, STA2 404, STA3 406, and STA4 408) transmitting a frame carrying a paging message or a paging acknowledgement message may set the value of the Duration field of the frame carrying the paging message or paging acknowledgement message to be simply the pre-specified duration of the Paging Window. Although, this alternative may be overly protecting the Paging Window, it saves the NAN2-compliant STAs (such as STA1 402, STA2 404, STA3 406, and STA4 408) from having to compute the value to be set the Duration field to in the frame.

Then, at the beginning of the Data Transmission Window 431 at T5 470, STA1 402 starts to transmit Data 440 to STA2 404 without having to contend for the channel again, because there are no other Wi-Fi STAs (NAN2-compliant or non-NAN2-compliant) that are able to gain the access to the channel at that moment. A SIFS period after receiving Data 440, STA2 404 sends back an acknowledgement (ACK) frame (such as ACK 445) to STA1 402. Then, STA1 402 and STA2 404 may enter a power saving mode, if they don't have additional data to transmit or receive according to a paging message transmitted or received earlier during the Paging Window. Meanwhile, STA3 406 and STA4 408 may operate in a power saving mode during the time period of TXOP1 433 as they don't expect to transmit or receive any data. STA3 406 and STA4 408 may wake up at the end of TXOP1 433 or just a short moment before time T7 474, depending on their implementation. Then at time T7 474 (corresponding to the beginning of TXOP3 435), STA3 406 starts to transmit Date 450 to STA4 408 without having to contend for the channel again. A SIFS period after receiving Data 450, STA4 408 sends back an acknowledgement (ACK) frame (such as ACK 455) to STA3 406.

Therefore, STA3 406 and STA4 408 (in FIG. 4) are able to operate in a power saving mode longer than STA3 306 and STA4 308 (in FIG. 3) are able to. And the channel during the Data Transmission Window 431 in FIG. 4 is utilized more efficiently than in the Data Transmission Window 331 in FIG. 3.

Since all inter-frame spaces used by NAN2 STAs during the Data Transmission Window are SIFSs, which are shorter than a DIFS, a non-NAN2-compliant Wi-Fi STA or AP would not be able to detect that the channel has been idle for a DIFS period until all subscribed TXOPs are completed or until the end of the Data Transmission Window, whichever comes first. Therefore, a non-NAN2-compliant Wi-Fi STA or AP can't interrupt the NAN2 data transmissions during the Data Transmission Window. This is consistent with the design philosophy for NAN2 to pack all NAN2 data as efficiently as possible within the designated NDL slots (so that fewer designated NDL slots are needed) in order to reduce power consumption on these NAN2-compliant STAs. Therefore, a designated NDL slot may be used almost exclusively by NAN2-compliant STAs unless there is not enough NAN2 data to fill the NDL slot. As the NAN2-compliant STAs eventually enter a power saving mode outside the NDL slots and the DWs, non-NAN2-compliant Wi-Fi STAs or APs will eventually be able to contend for the channel in order to transmit their respective data. Therefore, the overall fairness among the NAN2-compliant STAs and non-NAN2-compliant Wi-Fi STAs can be maintained by carefully configuring the number and duration of NDL slots.

A data source STA may subscribe more than one TXOP, each TXOP targeted for different STA(s), by packing multiple paging messages into one frame that the data source STA transmits, one paging message for each TXOP subscribed. The data source STA may need to ensure that these subscribed TXOPs are arranged sequentially, the specified timing information of these TXOPs are not overlapping with each other, and there is a pre-specified short interval (such as a SIFS) between any two adjacent TXOPs. In this case, there will be multiple frames, with each frame carrying a paging acknowledgement message, transmitted back to the data source STA. Each frame carrying the paging acknowledgement message is transmitted by a data sink STA that is the targeted recipient of the corresponding paging message. And these frames carrying the paging acknowledgement messages are transmitted in the same order that their corresponding paging messages are packed in the frame that is received from the data source STA and there is a pre-specified short interval (such as a SIFS) between any two adjacent frames carrying the adjacent paging acknowledgement messages.

Traditionally, a STA needs to process the content of a frame beyond the MAC header of the frame only if the receiver address in the MAC header is a broadcast address or an individual address that matches with the STA's MAC address. This practice helps to save the power consumption on the STA as the STA doesn't process the frames that are not targeted for it. Since the paging message and paging acknowledgement message contain the timing information that needs to be processed by other STAs that are not the targeted data sink STAs, it is desirable that the paging message and paging acknowledgement message are carried by a new type of frame (such as a Paging frame) so that all NAN2-compliant STAs can easily identify a received frame is a Paging frame, e.g., based on the frame type. Then, each of these NAN2-compliant STAs may apply a special processing rule to the received Paging frame such that even if the receiver address in the MAC header is not a broadcast address nor does it match with the STA's MAC address, the STA still processes the timing information included in the paging message or paging acknowledge message in the Paging frame and complies with the included TXOP, e.g., by subscribing its own TXOP occurring a SIFS after the specified TXOP that has been subscribed by the other STA. As mentioned before, these NAN2-compliant STAs also apply another special processing rule regarding not updating their respective NAVs with the value in the Duration field in a received Paging frame, so that they can continue their attempts to access channel during the rest of the Paging Window for transmitting a paging message.

Figure 6:
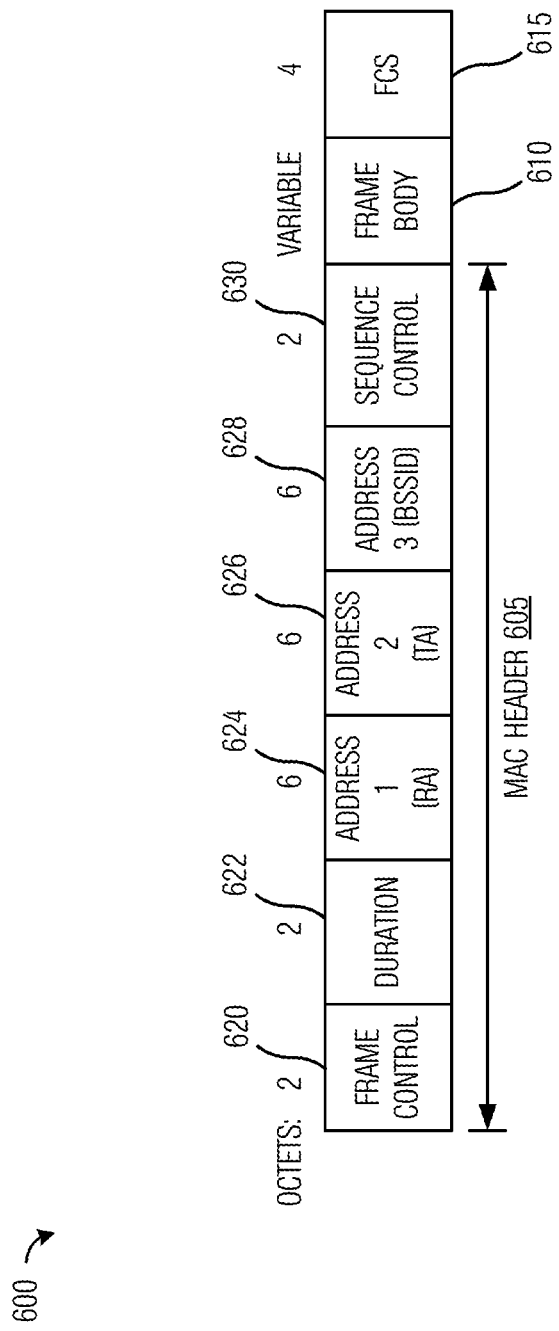
FIG. 6 illustrates an example embodiment of a Paging frame format in accordance with an embodiment presented herein.

According to an example embodiment, such a new Paging frame is based on a Vendor Specific Public Action frame as defined in the IEEE 802.11 Standards. FIG. 6 illustrates an example Paging frame 600. As shown in FIG. 6, Paging frame 600 includes a MAC header 605, a frame body 610, and a frame check sum (FCS) 615. The MAC header 605 includes a Frame Control field 620, a Duration field 622 (as described previously), an Address 1 field 624 (which is also referred to as the receiver address (RA) field), an Address 2 field 626 (which is also referred to as the transmitter address (TA) field), an Address 3 field 628, and a Sequence Control field 630. The format and contents of the frame body field of the Paging frame are defined in Table 1 shown below.

TABLE 1

The Format and Contents of the Frame Body field of the Paging frame

| Field Name: | Size (Octets) | Value (Hex) | Description: |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x14 | Identifying that the type of the Vendor- Specific Public Action frame is Paging frame |
| Attribute | Variable | Variable | Containing one or more Paging Attributes or containing a Paging ACK Attribute as indicated by the Attribute ID |

The Category field contains a value indicating that the frame is an IEEE 802.11-defined Public Action frame. The Action field contains a value indicating that the Public Action frame is a Vendor-Specific Public Action frame. The Organizationally Unique Identifier (OUI) field contains a value of 50-6F-9A, expressed in hexadecimal, indicating that it is the Wi-Fi Alliance (WFA) specific OUI. The OUI Type field contains a value (e.g. a value of 14 expressed in hexadecimal) indicating that the type of the Vendor-Specific Public Action frame is a Paging frame.

If a Paging frame is sent by a data source STA, the Attribute field as shown in Table 1 may contain one or more Paging Attributes, each Paging Attribute includes a paging message subscribing a TXOP. An Attribute Identifier (ID) subfield of each Attribute included in the Paging frame indicates which attribute it is. A data source STA may use a Paging frame to subscribe more than one TXOP by including more than one Paging Attribute in the Paging frame, with one Paging Attribute for each TXOP subscribed. The format and contents of the Paging Attribute are defined in Table 2 shown below. The Attribute ID field contains a value (e.g., a value of 10 expressed in hexadecimal) indicating that the type of attribute is Paging Attribute. The Length field contains a value equal to the length of the remaining fields in the Paging Attribute. The TXOP Starting Time and TXOP Ending Time fields contain values equal to the starting time and ending time of the subscribed Transmission Opportunity (TXOP), respectively. The Paged ID field contains one or more identifiers (IDs) of the STAs being paged. The one or more identifier may be one or more individual identifier of the STAs being paged, such as the MAC address of the STAs being paged. Or the identifier may be a group identifier identifying a group of STAs being paged.

TABLE 2

The Format and Contents of the Paging Attribute

| Field Name: | Size (Octets) | Value | Description: |
|---|---|---|---|
| Attribute ID | 1 | 0x10 | Identifies that the type of attribute is Paging Attribute. |
| Length | 2 | 2 | Length of the following field in the attribute. |
| TXOP Starting Time | 2 | variable | The starting time of the subscribed TXOP |
| TXOP Ending Time | 2 | variable | The ending time of the subscribed TXOP |
| Paged ID | 6 × N | variable | One or more Paged IDs, where N is the number of Paged IDs in this container. |

The data sink STA, of which the Paged ID appears first in the Paged ID field, is responsible for transmitting a paging acknowledge message back to the data source STA. If there are more than one Paging Attribute in a Paging frame, there will be more than one responsible data sink STA. Each responsible data sink STA determines its timing for transmitting a Paging frame carrying its paging acknowledge message based on the order that its corresponding Paging Attribute appears in the Paging frame received. Since the length of a paging acknowledgement message (thus the duration of the Paging frame carrying the paging acknowledgement message) and the SIFS period between two adjacent Paging frame carrying two adjacent paging acknowledgement messages are fixed and pre-specified, once the order is known, the timing for transmitting the Paging frame carrying the paging acknowledge message can be derived algorithmically.

If a Paging frame is sent by a data sink STA, the Attribute field in Table 1 may contain one Paging Acknowledgement (ACK) Attribute, which includes a paging acknowledge message. Due to the strict timing between receiving a paging message and transmitting a paging acknowledgement message, one Paging frame can only contain one paging acknowledgement message, thus one Paging Acknowledgement (ACK) Attribute at a time. This also helps to ensure that the duration of a Paging frame carrying a paging acknowledgement message is fixed and predictable. The format and contents of the Paging ACK Attribute are defined in Table 3 below. The Attribute ID field contains a value (e.g., a value of 11 expressed in hexadecimal) indicating that the type of attribute is Paging ACK Attribute. The Length field contains a value equal to the length of the remaining fields in the Paging ACK Attribute. The TXOP Starting Time and TXOP Ending Time fields contain values equal to the starting time and ending time of the subscribed Transmission Opportunity (TXOP), respectively, which are copied from the corresponding paging message.

TABLE 3

The Format and Contents of the Paging ACK Attribute

| Field Name: | Size (Octets) | Value | Description: |
|---|---|---|---|
| Attribute ID | 1 | 0x11 | Identifies that the type of attribute is Paging ACK Attribute. |
| Length | 2 | 2 | Length of the following field in the attribute. |
| TXOP Starting Time | 2 | variable | The starting time of the subscribed TXOP |
| TXOP Ending Time | 2 | variable | The ending time of the subscribed TXOP |

As shown in Table 2 and Table 3, a TXOP Ending Time field is included in the Paging Attribute and Paging ACK Attribute, as an example of the second embodiment as described previously. If the first embodiment as described previously is used, these TXOP Ending Timing fields should be replaced with a TXOP Duration field.

Figure 7:
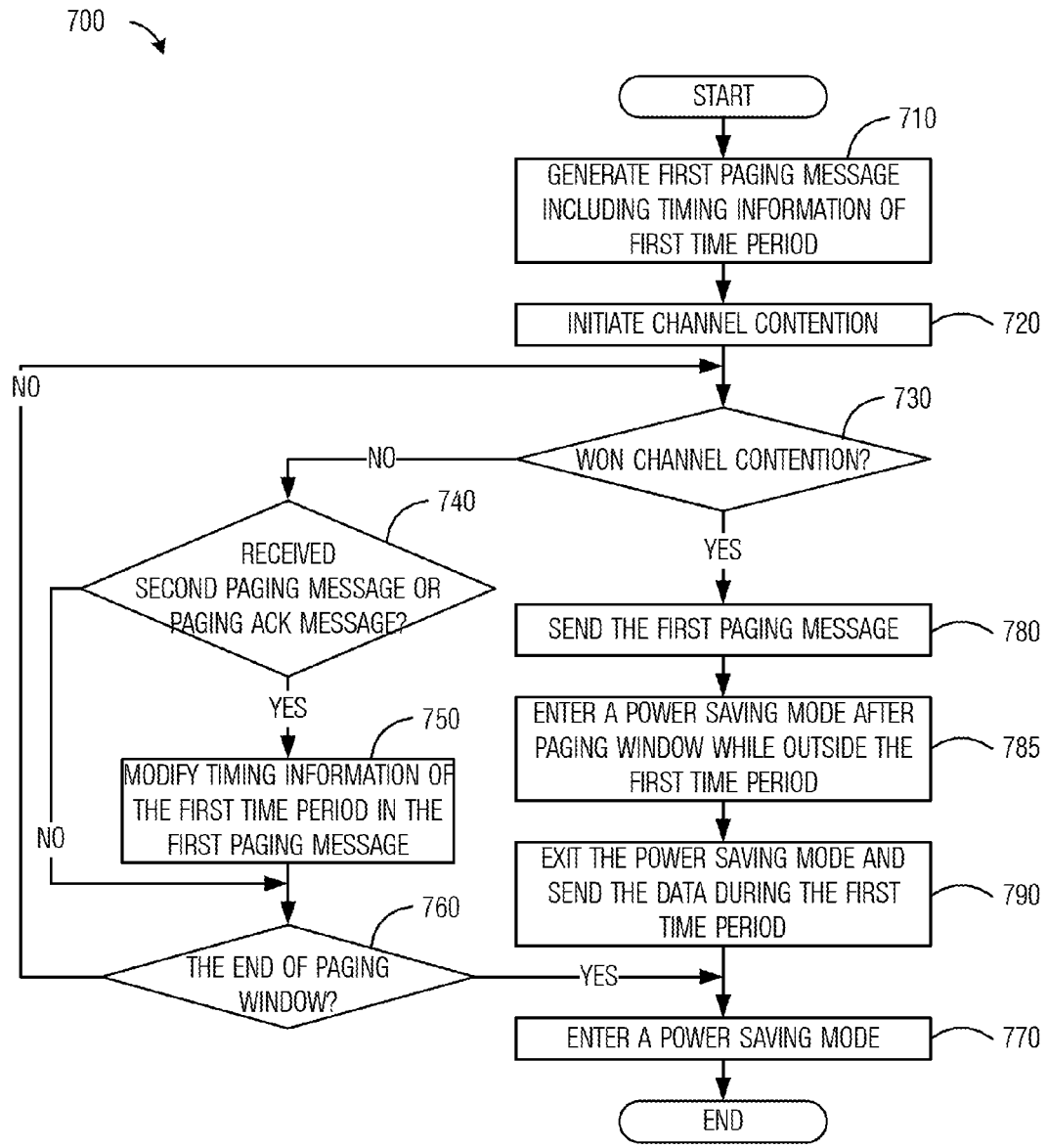
FIG. 7 illustrates a flow diagram of example operations occurring in a communications station transmitting a data in accordance with an embodiment presented herein.

FIG. 7 illustrates a flow diagram of example operations 700 occurring in a communications station transmitting a data. Operations 700 may be indicative of operations occurring in communications station such as a NAN2 STA, as the communications station transmits a data.

Operations 700 begin with the communications station generating a first paging message, the first paging message including timing information of a first time period during which the station wishes to transmit the data (block 710). The station initiates a channel contention for transmitting the first paging message during a paging window (block 720). Then, the station determines if it has won the channel contention (block 730). If not, the station further determines if it has received a second paging message or a paging acknowledgement (ACK) message carrying timing information of a second time period, during which another station wishes to transmit (block 740). If the station determines that it hasn't received the second paging message or the paging acknowledgement message in block 740, the station further determines if the paging window has ended (block 760). If the station determines that it has received the second paging message or the paging acknowledgement message carrying timing information of the second time period in block 740, the station modifies the timing information of the first time period in the first paging message such that the first time period, as modified, follows the second time period with a short interval (such as a SIFS) in between (block 750), and then the station determines if the paging window has ended (block 760). If the station determines that the paging window has ended in block 760, it may enter a power saving mode (block 770). If the station determines that the paging window hasn't ended in block 760, it goes back to determine if it has won the channel contention (block 730). If the station determines that it has won the channel contention in block 730, the station sends the first paging message (block 780). The station may enter a power saving mode after the paging window and while outside the first time period (block 785). The station exits the power saving mode and sends the data during the first time period (block 790). Then, the station may enter a power saving mode (block 770).

Figure 8:
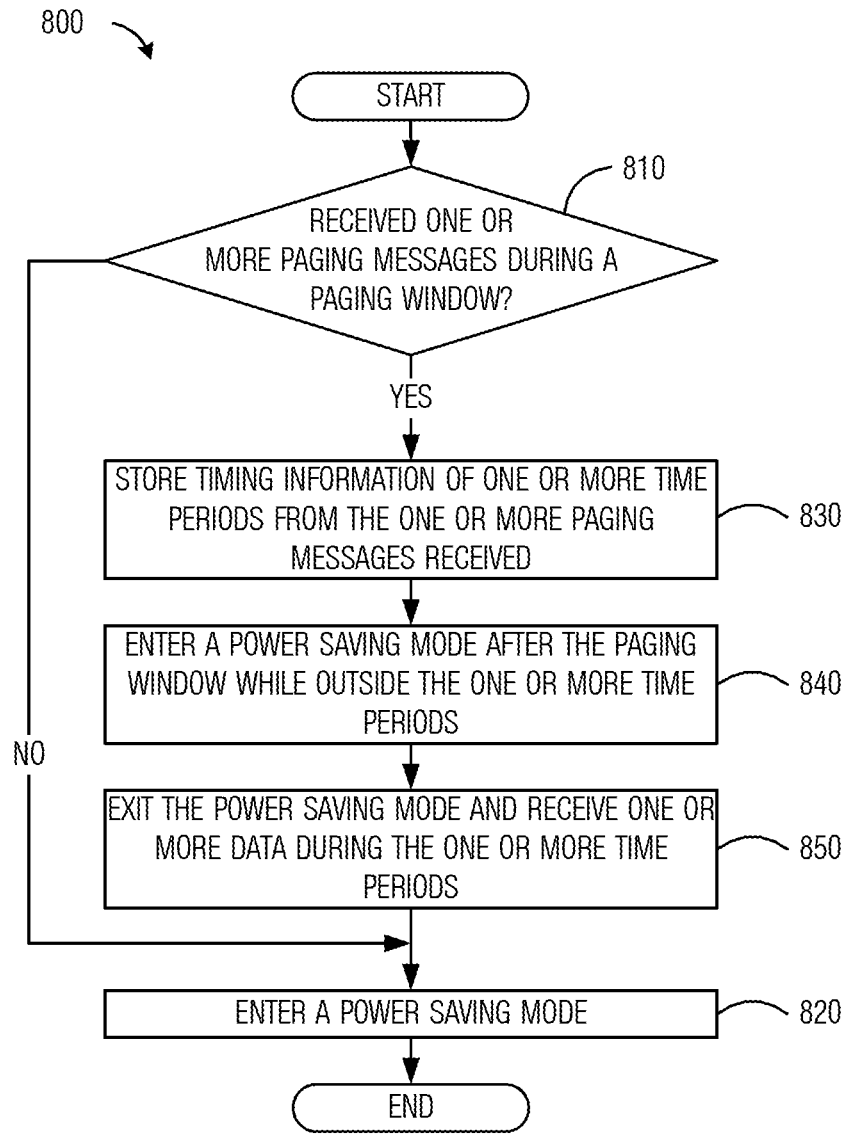
FIG. 8 illustrates a flow diagram of example operations occurring in a communications station receiving a data in accordance with an embodiment presented herein.

FIG. 8 illustrates a flow diagram of example operations 800 occurring in a communications station receiving a data. Operations 800 may be indicative of operations occurring in communications station such as a NAN2 STA, as the communications station receives a data.

Operations 800 begin with the communications station determining if it has received one or more paging messages target for it or its group during a paging window (block 810). If not, the station may enter a power saving mode after the paging window (block 820). If the station determines that it has received one or more paging messages target for it or its group in block 810, the station stores the timing information of one or more time periods from the one or more paging message received (block 830). The station may enter a power saving mode after the paging window while outside the one or more time periods (block 840). The station exits the power saving mode and receive one or more data during the one or more time periods (block 850). Then, the station may enter a power saving mode (block 820).

The example embodiments described herein use the Wi-Fi Alliance Neighboring Awareness Network (NAN) stations merely as example communications stations. The same embodiments can be applied to any peer-to-peer wireless communications, such as the ones based on Bluetooth (BT), Bluetooth Low Energy (BLE), ZigBee, IEEE 802.15.4, IEEE 802.15.8 (Peer Aware Communications or PAC), evolution of IEEE 802.11s mesh network, Long Term Evolution (LTE) Device-to-Device (D2D), etc.

Figure 9:
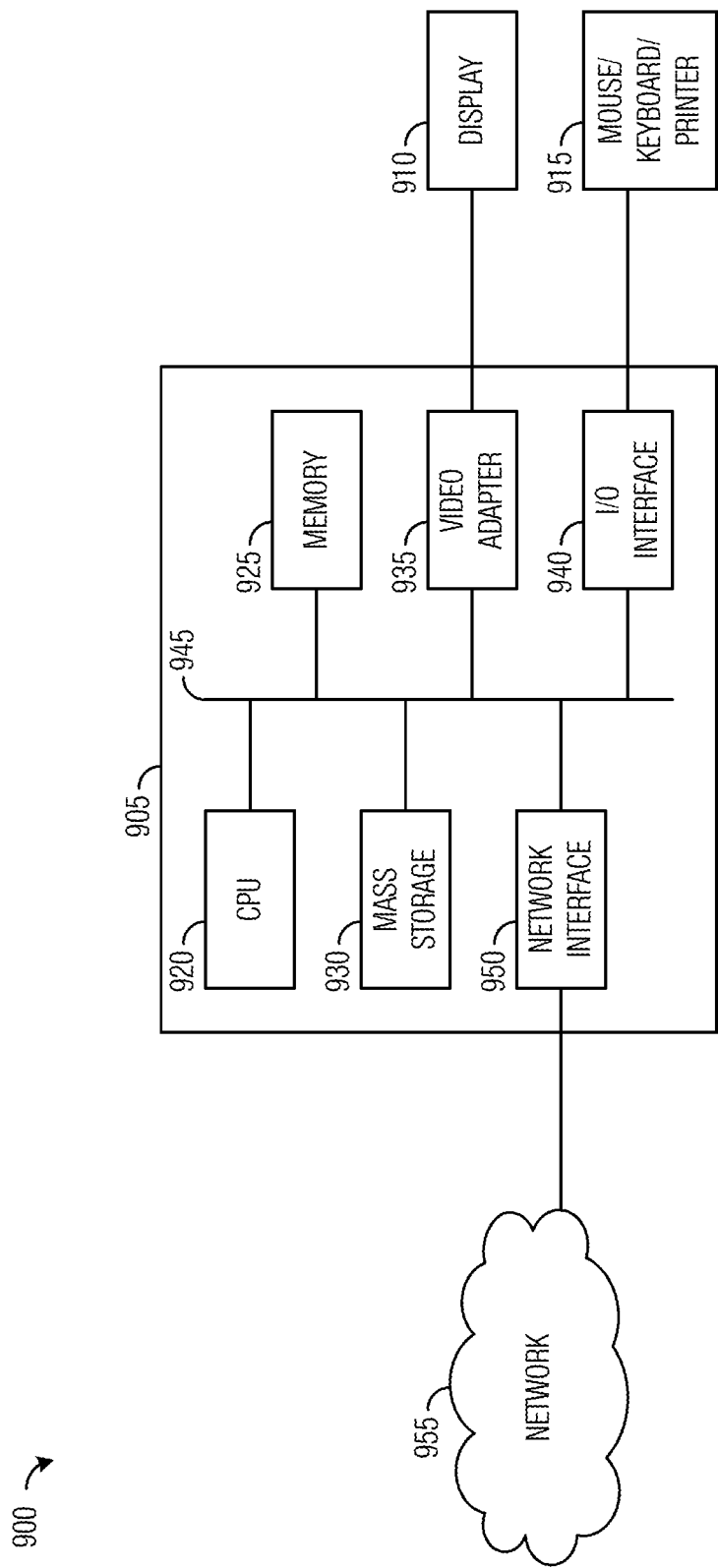
FIG. 9 illustrates a computing platform that may be used for implementing, for example, the devices and methods described herein, in accordance with an embodiment presented herein.

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 905 equipped with one or more input/output devices, such as a human interface 915 (including speaker, microphone, mouse, touchscreen, keypad, keyboard, printer, and the like), display 910, and so on. The processing unit may include a central processing unit (CPU) 920, memory 925, a mass storage device 930, a video adapter 935, and an I/O interface 940 connected to a bus 945.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 950, which may comprise wired links, such as an Ethernet cable or the like, and/or wireless links to access nodes or different networks 955, such as neighbor awareness networks (NAN). The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 10:
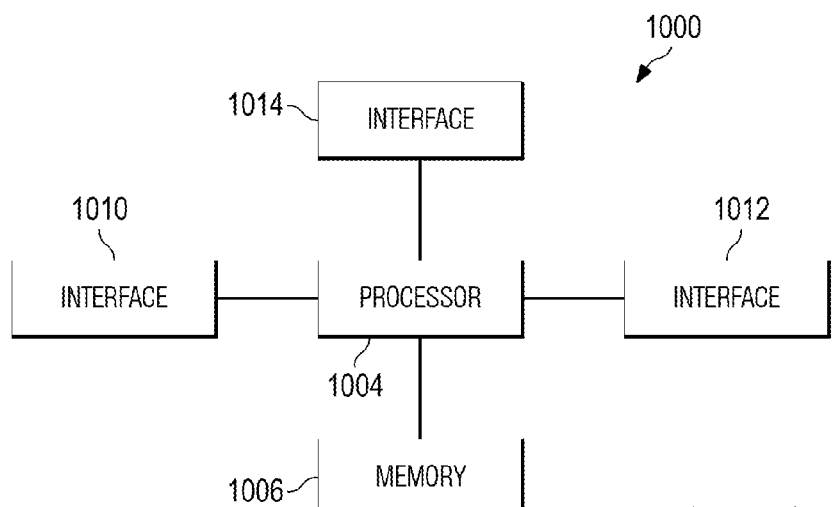
FIG. 10 illustrates a block diagram of an embodiment processing system for performing methods described herein.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
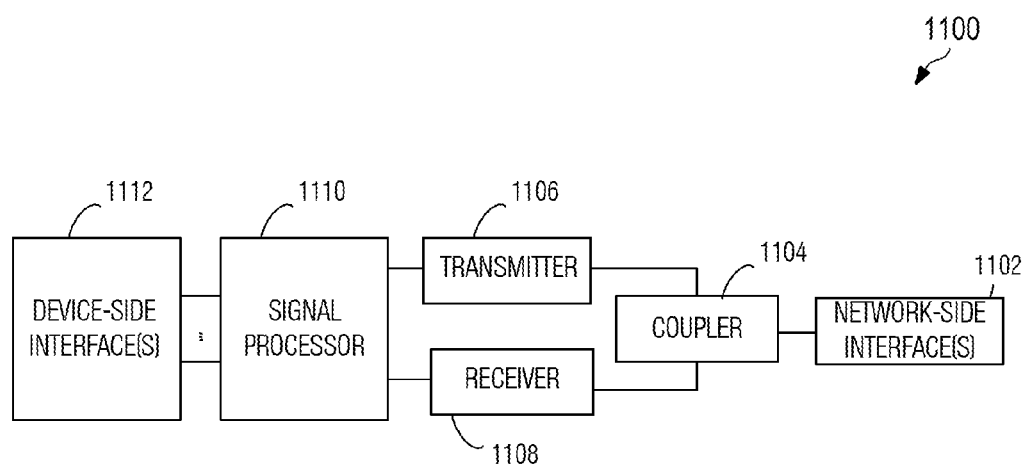
FIG. 11 illustrates a block diagram of a transceiver adapted to transmit and receive signaling over a telecommunications network in accordance with an embodiment presented herein.

In some embodiments, one or more of the interfaces 1010, 1012, 1014 connects the processing system 1000 to a transceiver adapted to transmit and receive signaling over a wireless telecommunications network. FIG. 11 illustrates a block diagram of a transceiver 1100 adapted to transmit and receive signaling over a wireless telecommunications network, such as a neighbor awareness network (NAN). The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a channel access unit/module, a modifying unit/module, and power saving unit/module. The respective units/modules may be hardware, software, or a combination thereof. For instance, one or more of the units/modules may be an integrated circuit, such as field programmable gate arrays (FPGAs) or application-specific integrated circuits (ASICs).

Advantageous features of embodiments of the invention may include: a method for operating a first station, the method includes transmitting, by the first station, a first paging frame including a first duration set to a time difference between an end of a paging window and an end of the first paging frame, wherein a channel is preserved to allow a second station to contend for access to the channel for the first duration after the end of the first paging frame while disallowing a third station to access the channel for the first duration after the end of the first paging frame. The method could further include, wherein the first paging frame further includes an identifier associated with a fourth station and timing information associated with a first time period for transmitting data to the fourth station, the first time period occurring after the paging window. The method could further include, wherein the first, and second stations are compliant with the Institute of Electrical and Electronic Engineers (IEEE) Standard 802.11 and a neighbor awareness networking (NAN) protocol, and wherein the third station is compliant with the IEEE Standard 802.11 but not the NAN protocol. The method could further include, further comprising, before transmitting the first paging frame: receiving, by the first station, a second paging frame from a fifth station, the second paging frame including a second duration set to the time difference between the end of the paging window and an end of the second paging frame; setting, by the first station, a network allocation vector (NAV) counter to a sum of a duration of a short inter-frame space (SIFS) and a duration of an acknowledgement frame; decrementing, by the first station, the NAV counter at a uniform rate; and attempting, by the first station, to obtain access to the channel when the NAV counter reaches zero, wherein transmitting the first paging frame comprises transmitting the first paging frame occurs only if the first station is able to obtain access to the channel and if a time remaining in the paging window is greater than a sum of durations of the first paging frame, a SIFS, and an acknowledgement frame. The method could further include, wherein the second paging frame includes an identifier associated with a sixth station and timing information associated with a second time period for a data transmission between the fifth station and the sixth station, the second time period occurring after the paging window and before a first time period for transmitting data to a fourth station.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for operating a first station configured for transmitting data, the method comprising:
   generating, by the first station, a first frame including an identifier associated with a second station and a first timing information associated with a first time period for transmitting the data to the second station, the first time period occurring after a paging window;
   while within the paging window,
      attempting, by the first station, to obtain access to a channel for transmitting the first frame,
      modifying, by the first station, the first timing information in the first frame in response to the first station receiving a second frame before obtaining the access to the channel, the second frame including a second timing information associated with a second time period, the first timing information modified in accordance with the second timing information such that the first time period follows the second time period by a pre-specified time interval, and
      transmitting, by the first station, the first frame in response to the first station obtaining the access to the channel; and
   after the paging window, transmitting, by the first station, the data during the first time period in response to the first station transmitting the first frame during the paging window.

2. The method of claim 1, further comprising:
   after the paging window,
      in response to the first station transmitting the first frame during the paging window,
         entering, by the first station, a power saving mode while not in the first time period, and
         exiting, by the first station, the power saving mode during the first time period.

3. The method of claim 1, wherein the first timing information includes a starting time and an ending time of the first time period and the second timing information includes a starting time and an ending time of the second time period.

4. The method of claim 1, wherein the first timing information includes a starting time and a duration of the first time period and the second timing information includes a starting time and a duration of the second time period.

5. The method of claim 1, wherein the first frame is a first Wi-Fi Alliance defined vendor-specific public action frame, and the first timing information associated with the first time period is included in a first paging attribute in the first frame, wherein the second frame is a second Wi-Fi Alliance defined vendor-specific public action frame, and the second timing information associated with the second time period is included in one of a second paging attribute or a first paging acknowledgement attribute in the second frame.

6. The method of claim 1, further comprising receiving, by the first station, a third frame from the second station after transmitting the first frame, the third frame including an acknowledgement to the first frame and a third timing information associated with the first time period, wherein the third timing information comprises the first timing information adjusted with a time duration elapsed between an end of the first frame and an end of the third frame.

7. The method of claim 6, wherein the third frame is a third Wi-Fi Alliance defined vendor-specific public action frame, and the third timing information associated with the first time period is included in a second paging acknowledgement attribute in the third frame.

8. A method for operating a station configured for receiving data, the method comprising:
   receiving, by the station, a first frame during a paging window, the first frame including an identifier associated with the station and a first timing information associated with a time period for receiving the data, the time period occurring after the paging window;
   storing, by the station, the first timing information associated with the time period for receiving the data;
   transmitting, by the station, a second frame, the second frame including an acknowledgement to the first frame and a second timing information associated with the time period; and
   receiving, by the station, the data during the time period.

9. The method of claim 8, further comprising:
   entering, by the station, a power saving mode after the paging window while not in the time period; and
   exiting, by the station, the power saving mode during the time period.

10. The method of claim 8, wherein the first timing information associated with the time period includes a starting time and one of an ending time of the time period or a duration of the time period.

11. The method of claim 8, wherein the second timing information comprises the first timing information adjusted with a time duration elapsed between an end of the first frame and an end of the second frame.

12. A first station adapted for transmitting data comprising:
   a processor; and
   a computer readable storage medium storing programming for execution by the processor, the programming including instructions to configure the first station to:
      generate a first frame including an identifier associated with a second station and a first timing information associated with a first time period for transmitting the data to the second station, the first time period occurring after a paging window,
      while within the paging window,
         attempt to obtain access to a channel for transmitting the first frame,
         modify the first timing information in the first frame in response to the first station receiving a second frame before obtaining the access to the channel, the second frame including a second timing information associated with a second time period, the first timing information modified in accordance with the second timing information such that the first time period follows the second time period by a pre-specified time interval, and transmit the first frame in response to the first station obtaining the access to the channel; and after the paging window, transmit the data during the first time period in response to the first station transmitting the first frame during the paging window.

13. The first station of claim 12, wherein the programming includes instructions to configure the first station to, after the paging window, in response to the first station transmitting the first frame during the paging window, enter a power saving mode while not in the first time period, and exit the power saving mode during the first time period.

14. The first station of claim 12, wherein the first timing information includes a starting time and an ending time of the first time period and the second timing information includes a starting time and an ending time of the second time period.

15. The first station of claim 12, wherein the first timing information includes a starting time and a duration of the first time period and the second timing information includes a starting time and a duration of the second time period.

16. The first station of claim 12, wherein the programming includes instructions to configure the first station to receive a third frame from the second station after transmitting the first frame, the third frame including an acknowledgement to the first frame and a third timing information associated with the first time period, wherein the third timing information comprises the first timing information adjusted with a time duration elapsed between an end of the first frame and an end of the third frame.

17. A station comprising:
a non-transitory computer readable storage medium storing instructions;
a receiver configured to receive a first frame during a paging window, the first frame including an identifier associated with the station and a first timing information associated with a time period for receiving data, the time period occurring after the paging window;
a processor coupled to the receiver and the storage medium, wherein the processor executes the instructions to store the first timing information associated with the time period for receiving the data;
a transmitter coupled to the processor and configured to transmit a second frame, the second frame including an acknowledgement to the first frame and a second timing information associated with the time period; and
the receiver further configured to receive the data during the time period.

18. The station of claim 17, wherein the processor executes the instructions to cause the station to enter a power saving mode after the paging window while not in the time period, and exit the power saving mode during the time period.

19. The station of claim 17, wherein the first timing information associated with the time period includes a starting time and one of an ending time of the time period or a duration of the time period.

20. The station of claim 17, wherein the second timing information comprises the first timing information adjusted with a time duration elapsed between an end of the first frame and an end of the second frame.

* * * * *